US008864057B2

(12) United States Patent
Bork et al.

(10) Patent No.: US 8,864,057 B2
(45) Date of Patent: Oct. 21, 2014

(54) PROCESSES FOR RECYCLING CARPET AND PRODUCTS OF SUCH PROCESSES

(75) Inventors: Joseph E. Bork, Westlake, OH (US); Stephen C. Paspek, Sr., Broadview Heights, OH (US); Alan F. Schroeder, Cleveland, OH (US); William H. Heise, Jonesborough, TN (US)

(73) Assignee: Shaw Industries Group, Inc., Dalton, GA (US)

( * ) Notice: Subject to any disclaimer, the term of this patent is extended or adjusted under 35 U.S.C. 154(b) by 418 days.

(21) Appl. No.: 13/289,703

(22) Filed: Nov. 4, 2011

(65) Prior Publication Data

US 2013/0112727 A1  May 9, 2013

(51) Int. Cl.
| | |
|---|---|
| B02C 21/00 | (2006.01) |
| B02C 17/00 | (2006.01) |
| C08J 11/08 | (2006.01) |
| C08J 11/04 | (2006.01) |
| D01B 9/00 | (2006.01) |
| B29B 17/02 | (2006.01) |
| B29K 105/06 | (2006.01) |
| B29L 31/00 | (2006.01) |

(52) U.S. Cl.
CPC .......... B29B 17/02 (2013.01); C08J 11/08 (2013.01); B29K 2105/065 (2013.01); B29K 2313/00 (2013.01); C08J 11/04 (2013.01); B29K 2105/06 (2013.01); B29L 2031/7322 (2013.01); D01B 9/00 (2013.01); Y10S 241/38 (2013.01)
USPC ................ 241/23; 241/24.19; 241/DIG. 38

(58) Field of Classification Search
USPC .............. 241/23, 24.19, 24.29, DIG. 38
See application file for complete search history.

(56) References Cited

U.S. PATENT DOCUMENTS

| | | | |
|---|---|---|---|
| 4,345,039 A | 8/1982 | Cowan et al. | |
| 5,294,384 A | 3/1994 | David et al. | |
| 5,457,197 A | 10/1995 | Sifniades et al. | |
| 5,535,945 A | 7/1996 | Sferrazza et al. | |
| 5,681,952 A | 10/1997 | Sifniades et al. | |
| 5,704,104 A | 1/1998 | Bacon et al. | |
| 5,840,773 A | 11/1998 | Booij et al. | |
| 5,889,142 A | 3/1999 | Mohajer et al. | |
| 5,898,063 A | 4/1999 | Stefandl | |
| 5,929,234 A | 7/1999 | Sifniades et al. | |
| 6,140,463 A | 10/2000 | Stefandl | |
| 6,398,138 B1 * | 6/2002 | Robinson et al. ............ 241/5 |
| 6,498,250 B2 | 12/2002 | Raets et al. | |
| 6,752,336 B1 | 6/2004 | Wingard | |
| 7,045,590 B2 | 5/2006 | Bell | |
| 7,067,613 B2 | 6/2006 | Mauldin et al. | |
| 7,550,516 B2 | 6/2009 | Berard et al. | |
| 7,659,320 B2 | 2/2010 | Berard | |
| 7,784,719 B1 | 8/2010 | Wingard | |
| 8,205,814 B2 | 6/2012 | Lindsey et al. | |
| 8,360,348 B2 | 1/2013 | Levy et al. | |
| 8,596,563 B2 * | 12/2013 | Levy et al. ............ 241/24.19 |
| 2008/0064794 A1 * | 3/2008 | Murdock et al. ............ 524/13 |
| 2008/0213562 A1 | 9/2008 | Przybylinski et al. | |
| 2009/0300982 A1 | 12/2009 | Mauldin et al. | |
| 2010/0330288 A1 | 12/2010 | Segars et al. | |
| 2011/0040027 A1 | 2/2011 | Keating | |
| 2011/0220293 A1 | 9/2011 | Yu | |
| 2012/0241542 A1 | 9/2012 | Lindsey et al. | |
| 2012/0298010 A1 | 11/2012 | Ginn | |
| 2013/0280976 A1 * | 10/2013 | McCann et al. ............ 442/288 |

FOREIGN PATENT DOCUMENTS

| | | |
|---|---|---|
| DE | 44 09 335 A1 | 9/1994 |
| JP | 61-034216 | 2/1986 |
| JP | 2003 164827 A | 6/2003 |
| JP | 2004-168023 | 6/2004 |
| JP | 2006-116298 | 5/2006 |
| WO | 00/10738 A1 | 3/2000 |
| WO | 2010/052478 A1 | 5/2010 |

OTHER PUBLICATIONS

English abstract of DE 44 09 335 A1.
English abstract of JP 2003 164827 A.
English Abstract of JP 2006-116298.
English Abstract of JP 2004-168023.
A. Sekiguchi et al., "Nylon Recovery from Carpet Wastes Through the Pyrolysis Under the Presence of ZnO and the Milling by a Metallic Rolling Machine," 6th Int'l Symposium on Feedstock Recycling of Polymeric Mat'ls, pp. 53-54 (Oct. 7, 2011).
Anonymous, "Separation Process," Research Disclosure No. 38813, p. 474, Aug. 1996.
Y. Wang, "Carpet Recycling Technologies," http://www.prism.gatech.edu/~yw6/Fiberrecycling/Recycling%20in%20Textiles%20YWang%20Ch6.pdf (Accessed Aug. 9, 2011).
Y. Wang et al., "Recycling of Carpet and Textile Fibers," Plastics and the Environment: A Handbook; Chapter 16, pp. 697-725, 2003.
English Translation of JP 2006-116298 A.
English Translation of JP 2003-164827 A.
English Translation of DE 44 09 335 A1.

* cited by examiner

*Primary Examiner* — Faye Francis
(74) *Attorney, Agent, or Firm* — Phan Law Group PLLC

(57) ABSTRACT

Methods for the recycling of carpet are disclosed that produce clean face fiber suitable for industrial use. The methods allow the recovery of face fiber material, for example a polyester or a polyamide, from carpets that includes a face fiber material and a backing material, and include the steps of heating the carpet to a temperature lower than the melting point of the face fiber material, but higher than the initial thermal decomposition temperature of the backing material, for a time and at a temperature sufficient to thermally decompose, pyrolyze, or oxidize at least a portion of the backing material, rendering the backing material friable, that is more friable than the untreated backing; and applying mechanical force to the carpet so as to liberate the friable backing material from the face fiber material.

23 Claims, No Drawings

PROCESSES FOR RECYCLING CARPET AND PRODUCTS OF SUCH PROCESSES

FIELD OF THE INVENTION

The present invention relates to methods for carpet recycling, and more specifically, to processes of recycling carpet that produce clean face fiber suitable for industrial use, and to the face fiber and other products produced using such processes.

BACKGROUND OF THE INVENTION

A typical carpet is composed of four distinct materials: 1) the face fiber or pile, often made of nylon, polyethylene terephthalate, or polyolefin; 2) the backing, often made of polypropylene or natural fibers like jute; 3) the binder or adhesive, often a styrene butadiene rubber (SBR) latex; and 4) the inorganic filler, often calcium carbonate or limestone. Thousands of tons of post-consumer and post-industrial carpet are sent to landfills each year. These carpets are difficult to recycle, being mixtures of various plastics, binders, inorganic fillers, and fibers. Many high-end uses of recycled carpet require separating the different polymers, removing dirt and other contaminants, and removing the binders and other fillers. By design, carpeting is difficult to deconstruct. It is built to survive decades of wear without having the face fiber pull free from the backing material, and without the binder failing.

The most valuable portion of the carpet is typically the "face fiber" material, also sometimes described as "pile," which is often a polyester or a nylon, and typically makes up from about 35 to about 65 wt. % of the carpet. Carpet to be recycled is often sorted based on its face fiber composition, with nylon carpet currently being more valuable due to the higher demand for recycled nylon.

One conventional method for recovering the face fiber material typically involves shearing, a method for removing face fiber material analogous to shearing a sheep to remove its fleece. In such methods, the balance is typically discarded. An advantage of this method is that most of the non-face fiber portion of the carpet is separated from the face fiber. A disadvantage of the method is that shearing is labor intensive. Pieces of carpet must be unrolled, cut into appropriately-sized pieces, and manually fed one-by-one into a shearing unit. The carpet must be fed into the shearer in the proper orientation, with the face fiber oriented toward the shearing blades, making the sheared fiber susceptible to contamination with the backing material. A further disadvantage of this method is that the yield of face fiber is low—typically only 25% to 50% of the face fiber is recovered.

In shearing, the cutting depth must be carefully adjusted to maximize face fiber recovery while minimizing cutting into the backing material. Unfortunately, carpet thicknesses vary. Deep cuts risk contaminating the sheared fiber, while shallow cuts result in yield losses. Cutter wear in such applications is significant and costly.

Another conventional method of carpet recycling is whole carpet shredding. The entire carpet is simply shredded into fibers, and a portion of the latex and inorganic filler are removed as sand or dust. However, this method has the disadvantage of leaving the backing polypropylene fibers still intermixed with the face fibers. Furthermore, the bottom end of each face fiber retains a significant portion of the latex and inorganic filler, making this face fiber unsuitable for uses that require a more purified recycled face fiber.

U.S. Pat. No. 5,889,142 discloses a process for selectively separating polyamides from multi-component waste materials that includes the steps of subjecting the multi-component mix to a specific mixture of caprolactam and water at a preselected temperature range below the degradation temperature of the polymer to be recovered, separating the formed polyamide solution, and recovering the desired polyamide.

U.S. Pat. No. 7,067,613 discloses, in the recycling of Nylon 6 and Nylon 6,6 polyamides from post-consumer or post-industrial waste, a process to separate the polyamides from commingled polyolefin waste components, particularly polypropylene, by admixing the waste with an ester solvent composition and heating the admixture to a temperature above the melting temperature of the contained polyolefins to form an ester solvent composition further containing dissolved polyamide polymer and a separate immiscible liquid polyolefin phase.

U.S. Pat. No. 6,752,336 discloses a method of recovering carpet materials by reducing carpet into size-reduced fibers, slurrying the size-reduced fibers in a liquid medium, and then selectively separating the size-reduced fibers in a centrifuge. The method is said to be particularly appropriate for recovering nylon or polyester face fibers from post-industrial, pre-consumer carpet waste.

U.S. Pat. No. 6,498,250 discloses a process for nylon depolymerization in which a multi-component material, comprising nylon and one or more non-nylon components, is fed to a depolymerization zone in which depolymerization of at least part of the nylon is effected, resulting in a product stream and a residue, the product stream containing monomers of the nylon, and the residue containing non-nylon components, in which the nylon content in the residue is measured and used to control the depolymerization process.

U.S. Pat. No. 7,784,719 discloses methods of recovering primary construction materials from whole carpet that are said to be particularly appropriate for recovering nylon or polyester face fibers from post-industrial, post-consumer carpet waste. The methods include reducing the whole carpet into fragmented carpet materials (i.e., pile, backing, and binder), further reducing the fragmented carpet materials into size-reduced fibers and binder, slurrying the size-reduced fibers and binder in an aqueous liquid medium (e.g., water), and then separating the size-reduced fibers and binder in a centrifuge.

U.S. Pat. Publn. No. 2011/0040027 discloses a method of recycling carpet components that comprises converting post-consumer carpet that includes a latex backing into a free-flowing powder that is said to be suitable for incorporation into one or more products as a recycled product component. Various processes of converting post-consumer carpet comprising a latex backing are disclosed, including a process in which a portion of face fibers may be harvested from used, post-consumer carpet, or the carpet may simply be shredded to form a first mixture, after which a portion of carpet fibers are separated from and removed from the first mixture to form a second mixture, which may subsequently be exposed to a relatively high level of heat to thermally degrade and/or partially volatilize polymeric material present in the second mixture. This mixture may then be incorporated into new products, either alone or admixed with a solid inorganic particulate material.

Notwithstanding the carpet recycling methods just described, there remains a need in the art for improved processes for recycling carpet, especially those containing face fibers such as nylons and polyesters.

SUMMARY OF THE INVENTION

In one aspect, the invention relates to processes for recovering face fiber material from a carpet that includes a face fiber material and a backing material, the processes include the steps of heating the carpet to a temperature lower than the melting point of the face fiber material, but higher than the thermal decomposition temperature of the backing material, for a time and at a temperature sufficient to decompose at least a portion of the backing material, rendering the backing material more friable than in its original state; and applying mechanical force to the carpet so as to liberate the friable backing material from the face fiber material. These steps may be carried out sequentially or simultaneously, so long as the backing material has been rendered sufficiently friable so as to be separable from the face fiber material. Similarly, the steps may be carried out in separate apparatuses or in the same apparatus, so long as the apparatus includes a means of heating the carpet and a means to apply mechanical force to the carpet so as to liberate the friable backing material from the fiber material. The steps can be carried out batch wise or continuously.

In another aspect, the invention relates to the face fiber material obtained from these processes, which is largely free of polypropylene, adhesive, and inorganic filler.

In a further aspect, the invention relates to friable backing material obtained from such processes, also called backing residue, which will typically constitute a backing material, and an adhesive such as a latex filled with an inorganic filler.

In a further aspect, the invention relates to inorganic filler obtained from these processes, which has uses, for example, in the backing of new carpet, pH adjustment of fluids, and coal desulfurization.

Further aspects of the invention are as disclosed and claimed herein.

DETAILED DESCRIPTION

Thus, in one aspect, the invention relates to a process that includes a step of heating a carpet that includes a face fiber material and a backing material, so as to render at least a portion of the backing material friable, that is, more friable than the untreated backing, such as by thermal decomposition. As used herein, the terms "thermal decomposition," "decompose," and the like are intended to include pyrolysis and/or oxidation reactions. Such thermal decompositions take place over a broad temperature range, and for purposes of the invention, the carpet or entangled fiber is heated to at least the "initial" thermal decomposition temperature, that is, the temperature at which the backing material begins decomposing. For this invention, the temperature at which thermal decomposition commences is less than the melting temperature of the face fiber.

The friable backing material, and optionally any other carpet components such as adhesive and inorganic filler, may then be freed from attachment to the face fibers, for example by simultaneously reducing the particle size of the friable components while freeing them from attachment to the face fibers. The heating step and the liberation step may be carried out sequentially, or simultaneously, so long as the backing material has been rendered sufficiently friable so as to be separable from the face fiber material.

The methods of the invention may be used to liberate the backing material from the face fiber material of any carpet in which the backing material may be preferentially thermally decomposed (or pyrolyzed and/or oxidized, as above) with respect to the face fibers, for example with any carpet in which the backing material decomposes at a lower temperature than the melting point or the decomposition point of the face fiber material. The greater the difference between the temperatures at which the two materials thermally decompose, the more satisfactory will be the subsequent separation.

The processes of the invention are best carried out in those cases in which the face fiber material does not melt at the temperature at which the backing material initially begins to decompose, although some melting may still be tolerated if a lower yield of face fiber material is acceptable. It may also be possible to preferentially heat the backing material so that the face fiber material does not substantially melt, and still recover the face fiber material from the backing material rendered friable, although it will be understood that the greater the difference in thermal decomposition temperature between the backing material and the face fiber material, the more satisfactory will be the subsequent separation according to the processes of the invention.

As used herein, the term "carpet" is intended to be interpreted broadly to describe a decorative or protective multicomponent material that includes a backing material, a face fiber material typically comprised of a plurality of fibers, and optionally an inorganic filler, typically combined with an adhesive, which itself has industrial uses once separated from the other carpet components. In one aspect, the face fiber material may comprise, for example, a nylon or a polyester, the backing material a woven polypropylene, and the adhesive an inorganic filled latex.

The types of carpet useful according to the invention include new carpet, post-industrial carpet, or post-consumer carpet. As used herein, the term "carpet" also includes the residue from carpet shearing processes, often referred to as "carpet carcass". This comprises backing material with the residual fiber that remains attached after mechanical shearing.

As used herein, the term "carpet" is also intended to include fibrous material comprised of two or more different types of fibers in which one type of fiber has a lower thermal decomposition or oxidation or pyrolysis temperature than the other. One example of such a material is trunk liner mat, which is comprised of non-woven PET fiber, which may be considered the face fiber material, and a polyolefin binder, which may be considered the backing material. Another example is carpet padding made from recycled carpet which may be comprised of PET or nylon fiber, and/or polypropylene fiber, and one or more backing components and adhesives.

According to the invention, the backing material, which is typically a woven material, comprises a material that may be thermally decomposed, pyrolyzed, or oxidized, for example a polyolefin such as polyethylene or polypropylene. The backing material may further comprise additional materials such as adhesives and inorganic fillers, as further described herein, which together form a friable backing material or a backing residue when the carpet is heated according to the invention, as further described herein.

The face fiber material may comprise, for example, a nylon or a polyester, or a mixture of nylons, or a mixture of polyesters, or a mixture of nylons and polyesters, which preferably melts at a temperature higher than the thermal decomposition temperature of the backing material. Nylons are, of course, also known as polyamides, and the terms are used herein interchangeably to describe polymers comprised of repeating units joined by amide groups, including without limitation nylon-6 and nylon-6,6. Polyesters amenable to separation according to the invention are polymers having repeating ester linkages and include polyethylene terephthalate (PET) homopolymers and copolymers, polybutylene terephthalate (PBT) homopolymers and copolymers, and the like, including those that contain comonomers such as cyclohexanedimethanol, cyclohexanedicarboxylic acid, and the like.

In carpet, the face fiber material is typically oriented with respect to the backing material in a U-shape, in which a fiber is inserted into the backing material and forms a U, with the middle of the fiber in contact with the backing material, and the fiber either cut to a uniform length, called plush pile, or left uncut, so-called loop pile. Piles of either form are described herein as face fibers, and are suitably separated from the backing material by the processes according to the invention.

Carpets are thus typically formed by the face fiber being anchored into a web of backing material, for example polypropylene threads, that are flexible at ambient temperature. Carpets useful for the inventive process may also include in the backing material an adhesive such as a latex, for example an SBR (styrene/butadiene/rubber) latex, filled with an inorganic substance such as calcium carbonate as an inorganic filler, provided to add weight to the carpet, with the adhesive helping to maintain the face fiber material attached to the backing material. The carpets may further comprise a polypropylene net material in contact with the adhesive material, also intended to ensure that the face fibers do not inadvertently separate from the backing material during use.

Indeed, it is the presence of these various materials intended to maintain the integrity of the carpet during use that make the subsequent separation of the face fibers from the backing material so difficult in practice. It is the preferential thermal decomposition of the backing material, and optionally any adhesive material and polypropylene netting, that assists in obtaining the usable face fiber material according to the invention.

As used herein, the term "friable" means that the material has been rendered more easily cut, ripped, torn, shredded, crumbled or pulverized, and is to be distinguished from the thermoplastic, or elastic, or flexible state of the backing material of the carpet such as would be the case, for example, of polyolefin threads provided as the backing material for the carpets during use. It is understood that the term "friable" should be interpreted broadly so as to cover any state in which a previously flexible backing material for a carpet is rendered more easily liberated and separated from the flexible face fiber material due to an increased tendency to crumble or pulverize due to at least a partial thermal decomposition and/or oxidation and/or pyrolysis of the backing material.

Thus, in one aspect, the invention relates to processes for recovering face fiber material from a carpet that includes a face fiber material and a backing material, the process comprising: a) heating the carpet to a temperature lower than the melting point of the face fiber material, but higher than the thermal decomposition temperature of the backing material, for a time and at a temperature sufficient to thermally decompose at least a portion of the backing material, rendering the backing material friable; and b) applying mechanical force to the carpet so as to liberate the face fiber material from the friable backing material. The carpet may be heated in step a) to a temperature, for example, from about 175° C. to about 260° C.

When the face fiber material comprises nylon 6, for example, the carpet may be heated in step a) to a temperature from 175° C. to 215° C. When the face fiber material comprises nylon 6,6, for example, the carpet may be heated in step a) to a temperature, for example, from 175° C. to 245° C. When the face fiber material comprises polyethylene terephthalate, for example, the carpet may be heated in step a) to a temperature from 175° C. to 260° C.

According to the invention, the carpet may be heated in step a) for a time, for example, from about 0.1 minutes to about 120 minutes.

In one aspect, steps a) and b) may be carried out in the same apparatus. In other aspects, steps a) and b) may be carried out sequentially, or simultaneously, and may be carried out in a batch process, or may be carried out in a continuous process.

In the processes according to the invention, the carpet may be cooled between steps a) and b), thereby causing at least a portion of the backing material to spontaneously fracture.

As used herein, the face fiber material may comprise a polyester, or a nylon (a polyamide), or both a nylon and a polyester, and the backing material may independently comprise a polyolefin, or a natural fiber, such as jute.

The invention further comprises the face fiber material recovered according to the processes of the invention. This face fiber material may be in the form of a fiber, or may be extruded to form an article, or may be injection-molded to form an article.

In a further aspect, the invention relates to the use of the face fiber material obtained according to the invention in one or more chemical recycling processes.

The process of the invention may further comprise separating any inorganic filler from the friable backing material, and the invention relates as well to the inorganic filler so obtained.

In yet another aspect, the invention relates to processes for recovering face fiber material from a carpet that includes a face fiber material and a backing material of different chemical composition than the face fiber material, the process comprising: a) heating the carpet to a temperature lower than the melting point of the face fiber material, but higher than the initial thermal decomposition temperature of the backing material, for a time and at a temperature sufficient to thermally decompose and/or oxidize at least a portion of the backing material, rendering the backing material more friable than the untreated backing; b) applying mechanical force to the carpet so as to liberate the face fiber material from the friable backing material; and c) removing any contaminants from the face fiber material through one or more mechanical means.

In another aspect, the invention relates to the friable backing material so obtained, and to a desulfurization agent comprising the friable backing material so obtained.

And in a further aspect, the invention relates to methods of separating at least a first type and a second type of fiber that are entangled, the process comprising: a) heating the entangled fibers to a temperature lower than the melting point of the first type of fiber, but higher than the thermal decomposition temperature of the second type of fiber, for a time and at a temperature sufficient to thermally decompose at least a portion of the second type of fiber, rendering the fibers of the second type of fiber friable; and b) applying mechanical force to the entangled fibers so as to liberate the first type of fiber from the friable second type of fiber.

In one aspect, then, the invention relates to a process that includes a step of heating a carpet comprised of at least a face fiber material and a backing material to a temperature lower than the melting point of the face fiber material, but higher than the initial thermal decomposition temperature of at least a portion of the backing material, for a time and at a temperature sufficient to thermally decompose at least a portion of the backing material, rendering it friable, that is, more friable than the untreated backing. The friable component(s) may then be liberated from attachment to the face fibers, for example by simultaneously reducing the particle size of the friable components while freeing them from attachment to the face fibers. This is to be distinguished from a case in which all of the polymeric material in the carpet (both face fiber and backing) is rendered friable or thermally decomposed, or a case in which the polymeric material is simply melted and blended to serve, for example, as composite material for uses in which the physicochemical properties of the resulting blend are not particularly demanding. This is also to be distinguished from a process in which the polymeric material is entirely thermally degraded, leaving only an inorganic residue. According to the present invention, the polymeric face fiber material is liberated and separated from the backing material in a form in which it may be used with relatively little further processing required.

In the processes of the invention, the temperature to which the carpet is heated may vary, for example, depending upon the nature of the face fiber material and the backing material. For example, the temperature may be at least about 175° C., or at least 190° C., or at least 200° C., up to about 235° C., or up to 245° C., or up to 250° C.

When the face fiber material comprises a polyester, for example a polyethylene terephthalate having a melting point from about 250° C. to about 260° C., the carpet may be heated to a temperature from about 175° C. to about 250° C., or from 180° C. to 245° C.

When the face fiber material comprises a nylon, for example nylon 6,6 having a melting point from about 240° C. to about 250° C., the carpet may be heated to a temperature from about 175° C. to about 240° C., or from 180° C. to 235° C.

When the face fiber material comprises a nylon, for example nylon 6 having a melting point from about 215° C. to about 220° C., the carpet may be heated to a temperature from about 175° C. to about 215° C., or from 180° C. to 210° C.

When the backing material comprises a polypropylene that begins thermally decomposing at a temperature of about 175° C., the carpet may be heated to a temperature greater than 175° C. and less than the melting point of the face fiber.

The length of time during which the carpet will be heated will vary depending upon the temperature to which the carpet is heated as well as the composition of the backing material and the face fiber material, and may be for a time of at least about 0.1 minutes, or at least 2 minutes, or at least 3 minutes, or at least 5 minutes, up to about 120 minutes, or up to 60 minutes, or up to 30 minutes, or up to 10 minutes, or up to 5 minutes.

In one aspect, the carpet fed to the processes according to the invention may be provided as an entire bale of carpet shredded to a size suitable for easy handling. Shredded feed suitable for this process can range in top size from as small as 0.5 cm square to as large as 1 meter square. This shredding can occur in any type of commercial shredder or granulator, or can occur in a device such as a step cleaner or cotton gin or carding unit. Alternatively, the carpet may be used in a form in which no preparatory shredding or cutting is done, other than minimal cutting necessary to fit the carpet into the heating source.

According to the invention, after preparatory shredding, any ferrous contamination may be removed, for example, by magnetic separation. Fines may likewise be removed, although this too may not be required. We note that finer shredding, if used, will generate more fines. The shredded carpet may optionally be granulated and screened to obtain a relatively small particle size distribution. However, pieces of carpet at least 0.5 square inches, and more preferably 1 square inch, and more preferably 2 or more square inches appears to be suitable for this process.

The carpet may then be heated for a time and to a temperature sufficient to cause at least a portion of the backing material to thermally degrade and/or oxidize, becoming more friable upon cooling. As noted, the temperature to which the carpet is heated is preferably below the melting point of the face fiber material, but sufficiently high to cause thermal decomposition or oxidation of at least a portion of the backing material, which may include other non-face fiber organics or inorganics present in the carpet. However, the temperature of the environment to which the carpet is exposed in the heating device may be in excess of the melting point of the face fiber, since the carpet will require some time in the heating device for the actual carpet temperature to increase from ambient to a higher temperature.

The melting range of polyethylene terephthalate, for example, is about 250° C. to about 260° C. Useful conditions for polyester carpet, as further described elsewhere herein, are from about 175° C. to about 245° C., and for a length of time, for example, from about 0.1 to about 120 minutes.

The desired temperature for nylon 6,6 carpet may be slightly lower, since the nylon melting range is from about 245° C. to about 250° C. Useful temperatures for nylon 6,6 as further described elsewhere herein, are from about 175° C. to about 240° C., and for a length of time, for example, from about 0.1 to about 120 minutes.

The desired temperature for nylon 6 carpet may be slightly lower still, since the nylon melting range is from about 215° C. to about 220° C. Useful conditions for nylon 6 as further described elsewhere herein, are from about 175° C. to about 215° C. and for a length of time, for example, from about 0.1 to about 120 minutes.

Typically, the non-face fiber portions of the carpet will turn tan, brown, or black, and some vapors may be emitted from the decomposing or oxidizing organics.

An additional advantage of this invention is that through the heating portion of the process, many of the malodorous and/or pathogenic contaminants found in used carpet are vaporized, oxidized, pyrolyzed, carbonized, or otherwise destroyed. These would include items such as food and drink residues, bodily fluids, fecal matter, bacteria, vermin, etc. Such removal renders the face fiber from this process much cleaner and more hygienic than that derived by simple shearing.

As noted, the time and temperature needed to render at least a portion of the backing material friable will be a function of the composition of the carpet, and especially the composition of the face fiber material and the backing material, the rate of heat transfer in the heating device, and the size of the carpet piece being heated, and may be easily determined by one skilled in the art using routine experimentation. The carpet may thereafter be sufficiently cooled to solidify any melted or decomposed or oxidized portions, thus rendering them at least partially friable. The cooling applied may be wet or dry.

Once at least a portion of the backing material of the shredded carpet has been rendered friable, the friable portion of the carpet may be liberated from the face fibers, for example by being mechanically reduced to a smaller particle size by crushing or milling, for example using hammer milling, ball milling, rod milling, dual roll crushers, pin milling, single shaft shredders, dual shaft shredders, quad shaft shredders, granulators, carders, fiber combs, fiber "gins", autogenic grinding mills, fiber cleaners or any other device or combinations of devices capable of liberating the backing material from the face fiber material, such as by crushing the friable particles to a smaller size. We note that such devices do not typically significantly reduce the size of the face fiber material, for example the polyester or nylon fiber, since the fiber material remains substantially flexible, and not friable. This size reduction step can also serve to at least partially separate the liberated backing material from the face fiber. This crushing or milling also serves to liberate the agglomerates of friable material from the polyester or nylon fibers to which it was attached.

The contaminants may then be further separated from the face fiber, by any number of suitable wet or dry methods, for example by screening, aspiration, carding, combing, other mechanical fiber cleaners, water washing, air washing, or combinations of these methods.

We note that the heating step may be carried out simultaneously with the milling, for example in a ball mill provided with heated balls for this purpose.

Similarly, in certain devices such as in an "air swept" continuous ball mill, or in an "air swept" carding type unit, the liberating and the separating steps can be carried out simultaneously.

The face fibers may thereafter optionally be further washed, cleaned, combed or carded to further reduce attached contaminants using techniques known to those skilled in the art of fiber cleaning. A float/sink separation may optionally be provided to further reduce contaminants, thus capitalizing on the greater specific gravity of the decomposed contaminants vs. the specific gravity of the face fiber. Froth flotation may likewise optionally be used to further reduce contaminants, thus capitalizing on the much higher surface-to-volume ratio of the face fibers compared with that of the crushed contaminants. The cleaned fibers may thereafter optionally be formed into granules or pellets either by melting in a unit such as an extruder with an attached pelletizer or a Condux type densifier or by compression in a unit such as a California Pellet Mill, for easier handling and storage. Alternatively the fibers may be used as is, for example for chemical recycling or extrusion or injection molding.

In yet another embodiment, the carpet may be used as provided, without any further shedding or cutting, other than what might be necessary in order for the carpet to fit within the heat source selected. In this aspect, the carpet may be fed into or through an oven by any suitable means of conveyance.

A variety of heat sources may be used according to the invention, whether conventional natural convection ovens, forced convection ovens, microwave ovens, infrared ovens, or the like. Additional heating sources include rotary kilns, laser beams, heated rollers, heated solids, heated fluids, heated gases, and superheated steam. The heating can be direct or indirect. The heat source may be provided in such a way that heat is preferentially supplied to the backing material, or it may be applied to the entire piece of carpet.

As noted, the maximum temperature to which the carpet is raised will typically be less than the melting temperature of the face fiber material, that is, a temperature at which the face fibers do not substantially melt, yet at a temperature sufficiently high so as to at least partially decompose the backing material, that is, a temperature at which at least a portion of the backing material begins to decompose. Ideally, at least the portion of the backing material in contact with or adjacent to the face fiber material will thermally decompose and/or oxidize, so that the face fiber material may thereafter be adequately liberated from the friable backing material.

When the backing material is polypropylene, for example, the carpet may be treated at a temperature of at least 175° C., or at least 180° C., or at least 190° C., in order to render the backing material at least partially friable, or at least a portion of the backing material friable. When the face fiber material is polyethylene terephthalate, the carpet will typically be heated to a temperature no higher than 250° C., or no higher than 245° C., or no higher than 243° C., so as to avoid substantial melting of the face fiber material.

To further elaborate, in one aspect, the process is carried out by shredding a part or even an entire bale of carpet to a size suitable for easy handling. We note that it is not necessary to remove any baling wire prior to the shredding, since any wire pieces may be removed magnetically after shredding.

The shredding may be carried out in a variety of manners, for example using a twin-shaft shredder such as those made by SSI or Shred Tech, or a single-shaft shredder such as those made by Linder or Komptech or a granulator such as those made by Cumberland or Rapid, or a carding machine or a "cat's claw," such as those made by Southern Mechatronics or Laroche.

The shred size may, if desired, be less than one meter square, or less than one decimeter square, or less than 1 centimeter square or less than 0.5 cemtimeters square.

Any ferrous contamination may be removed, for example, by magnetic separation of nails, staples, other ferrous contaminants, and the like. Non ferrous metallic contaminants can be removed, for example, by eddy current machines.

Fines may optionally be removed at this point, if desired, using screening, aspiration, or any other suitable means to remove fines from the shredded material. The fines will typically be rich in calcium carbonate from the backing, as already described, and finer shredding will, of course, generate more fines.

The shredded carpet may optionally be granulated to an even smaller particle size distribution, for example by a granulator such as those made by Cumberland or Herbold. These granulators contain a screen that limits the size of the largest particles passing through the unit. Such a granulator screen, if used, may have holes, for example, that are less than 2 inches in diameter, or less than 1 inch in diameter. The size desired may be selected in order to maximize liberation of the face fiber material while minimizing chopping of the face fiber. Contaminants may optionally be removed post-granulation, for example by magnetic separation of ferrous contaminants, eddy current separation of non-magnetic metals, and/or screening and/or aspiration for removal of fines which, again, are typically rich in calcium carbonate from the carpet backing.

The chopped carpet is then heated at a sufficient time and to a temperature to cause the non-face-fiber material components to become friable upon cooling, but below the melting point of the face fiber material. The temperature must, of course, nonetheless be sufficient to cause thermal decomposition of at least a portion of the backing material of the carpet.

The heating of the carpet according to the invention may be carried out in a variety of manners, whether in a batch or a continuous manner, and using a variety of heat sources.

In one aspect, the heating of the carpet may be carried out in batch mode, in which carpet is placed within or on a heat source, such as an oven or heated enclosed space.

In another aspect, the heating of the carpet may be carried out continuously, in which the carpet is conveyed upon or within a variety of heat sources, such as ovens equipped with a moveable conveyor, rotary kilns, heated rollers, pneumatic transport devices equipped with air heaters, etc. The carpet pieces may remain in the same orientation in which they were fed into the device, or they may be turned or tumbled or mixed as they pass through the heating device. The turning may be accomplished by mechanical means or by gas jets or by other means. Tumbling of the pieces may be accomplished by having one conveyor belt discharge onto another conveyor belt or by creating an "S" bend in a single conveyor belt. Heating and mixing can occur simultaneously in a heated pug mill or screw conveyor. Heating sources suitable for practice of the invention may thus include a static oven, a rotary kiln, or an oven with a moving belt. The heating of the carpet may occur in air, that is, no special atmosphere is required. Alternatively, the heating may be carried out in an atmosphere selected so as to minimize the formation of oxidation products, leading to increased pyrolysis reactions and pyrolysis products.

The heating can be carried out in the presence of oxygen, since one mode of thermal decomposition of the backing material is an oxidative process, in which oxygen is beneficial so as to render the desired friability. Such heating can be carried out in normal air, or in oxygen-depleted air such as that found in recirculated flue gas.

The carpet can be oriented in the heating devices in a number of ways. On a moving conveyor belt, for example, the carpet may be loaded pile side up or pile side down. The carpet pieces may overlap or be stacked one upon the other. Stacked or overlapped pieces may be oriented pile-to-pile or pile-to-backing. If the carpet is passed over a single heated roller, the carpet could be oriented with the pile towards the heated roller or away from the heated roller, although orientation of the backing towards the heated roller may be preferable. If the carpet is passed between two heated rollers, then orientation is irrelevant, since one roller will always be in contact with the backing. If the carpet pieces are heated in a device such a rotary kiln that tumbles the pieces or if the carpet pieces are heated in a device that stirs or mixed the pieces, then no orientation of the carpet pieces is possible or required.

We note that typically, when the face fiber material is polyethylene terephthalate, nylon, or the like, the non-face fiber portions of the carpet will turn beige, tan, brown, or black, and some vapors or smoke may be emitted from the decomposing organic materials present. The actual time and temperature selected, as already noted, will be a function of the composition of the carpet, and especially the composition of the face fiber material and the backing material. Other materials such as latex or other types of adhesive and the like may also be present, typically filled with an inorganic filler, and the temperature may be selected so as to also render friable these additional materials. Any adhesive and/or inorganic filler remaining may be separated from the face fiber material using any suitable means, as described elsewhere herein. A suitable temperature may be selected by those skilled in the art based on the components of the carpet, and the time and temperature may likewise be varied as the source of the carpet changes, in order to obtain a suitable separation of the backing material and other components from the face fiber material.

The carpet is, of course, subsequently cooled sufficiently so as to solidify at least a part of the melted portions of the backing material, rendering them more friable. A variety of types of cooling may be acceptable, whether wet or dry. These would include air, humidified air, water mist, or liquid water. Indirect cooling methods such as chilled rollers could also be useful. Heat exchange devices may be utilized to recover waste heat.

If the subsequent size reduction step will include wet granulation or the like, then the hot carpet may be dropped directly into liquid water and pumped to the size reduction apparatus.

After cooling, the face fiber material is liberated from the friable backing material by any suitable method, for example by mechanically reducing the size of the friable portion of the chopped carpet to an average particle size smaller than that at which they entered the step. Options include hammer milling, ball milling, rod milling, dual roll crushers, pin mills, single shaft shredders, dual shaft shredders, quad shaft shredders, granulators, carders, fiber combs, fiber "gins", step cleaners, air classifiers, autogenic grinding mills, fiber cleaners, or any other device capable of reducing the friable particles to a smaller size and liberating them from the face fiber.

We note that such devices will typically not significantly reduce the size of the face fiber material, because the temperature to which the carpet is heated is selected so that the face fiber material remains substantially flexible and not friable. We note that the size reduction step just described also serves to liberate the agglomerates of friable backing material from the face fiber material to which it was attached. The contaminants may then be separated from the face fiber material using any suitable method, for example a wet or dry method such as screening, aspiration, combing, carding, water washing, or air washing. Alternatively, in a device such as an air swept continuous ball mill, the milling and separation steps may be carried out simultaneously.

The resulting face fiber material may optionally be combed or carded to further reduce any attached contaminants, as is done to remove burrs, seeds, etc. from natural fibers. An optional float/sink separation technique may be used to further reduce contaminants, thus capitalizing on the greater specific gravity of the decomposed contaminants vs. the specific gravity of the face fiber material. A froth flotation may optionally be used to further reduce contaminants, capitalizing on the much higher surface-to-volume ratio of the face fiber material compared with that of the crushed contaminants, for example using micro air bubbles to cause the face fiber to float in water while the contaminants sink.

Further, the face fiber may optionally be pelletized for easy handling and storage, via an extrusion and pelletizing operation, for example with a Gala underwater pelletizer, or compression pelletized for example using a California pellet mill. The face fiber could be agglomerated in a unit such as a Condux agglomerator or a tub densifier. The face fiber could be baled or boxed.

As will be readily appreciated from the foregoing, advantages of the invention include higher recovery of face fiber compared to shearing; higher quality of face fiber compared to simple shredding; low manpower; the use of whole, unopened bales; avoidance of extensive manual cutting of the carpet; avoiding shearing and insertion of the carpet in a specific orientation; lower operating cost; and the like.

The invention further relates to face fiber material liberated according to the invention, which face fiber material may have a variety of uses, including as a reactant in a chemical recycling process, for example alcoholysis, glycolysis or ammonolysis, or use as-is as a fibrous material, or further reacted to increase the molecular weight of the nylon or the polyester, as the case may be.

Any remaining backing residue may also find use in a number of applications. Typically the friable backing material, or generally the backing residue, once separated from the face fiber material, will comprise an inorganic filler rich in calcium carbonate and will have a nominal BTU value of approximately 3,000 BTUs per pound. The backing residue may, for example, be blended with coal to provide sulfur capture and heating value. The backing residue, and especially the inorganic filler, may also be sized and re-used in new carpet as an "inert filler" in the latex or other adhesive. The inorganic filler of the backing residue may also find use in adjusting the pH of various fluids.

EXAMPLES

Comparative Example 1

Nylon carpet was shredded and sieved to remove granules of backing from the face fiber. Yield of fiber was about 50% of the feed to the process. The composition of the face fiber product was 75% nylon, 18% polypropylene, and 7% ash.

Comparative Example 2

Nylon carpet was sheared to remove the face fiber, leaving behind a carcass that comprised the backing and a portion of the face fiber. The yield of face fiber was about 23 wt % of the feed to the process, and the face fiber contained about 2 wt % ash.

Example 1

A sample of nylon carpet was passed through a convection oven held at 410° F. with a total residence time of 5 to 10 minutes to partially decompose the carpet backing. The oven product was then hammer milled to liberate the backing residue from the face fiber. Face fiber was separated from the bulk of the backing residue by screening. The fiber was then further cleaned by carding. The yield of face fiber was about 43 wt %, and the fiber was analyzed at 98% nylon. The residual material in the fiber consisted of additional granules of decomposed backing that could have been removed by further carding.

Example 2

A sample of PET carpet was passed through a convection oven held at 455° F. with a total residence time of 5 minutes to partially decompose the carpet backing material. The oven product was then hammer milled to liberate the backing residue from the face fiber. Face fiber was separated from the bulk of the backing residue by screening. The fiber was then further cleaned by carding. The yield of face fiber was about 67 wt %, and the fiber was analyzed at 96% PET. The residual material in the fiber consisted of additional granules of decomposed backing that could have been removed by further carding.

Example 3

Another sample of PET carpet was passed through a convection oven held at 410° F. with a total residence time of 10 minutes to partially decompose the carpet backing. The oven product was then hammer milled to liberate the backing residue from the face fiber. Face fiber was separated from the bulk of the backing residue by screening. The fiber was then further cleaned by carding. The yield of face fiber was about 62 wt % and the fiber was analyzed as 92% PET.

Example 4

Another sample of PET carpet was heated in a batch oven held at 410° F. with a total residence time of 30 minutes to partially decompose the carpet backing. The oven product was then ball milled to liberate the backing residue from the face fiber. Face fiber was separated from the bulk of the backing residue by screening. The yield of face fiber was about 55 wt %.

Example 5

PET carpet was heated in a batch oven held at 420° F. with a total residence time of 10 minutes to partially decompose the carpet backing. The oven product was then size reduced in a three bladed single shaft granulator to liberate the backing residue from the face fiber. Face fiber was separated from the bulk of the backing residue by screening. The yield of face fiber was about 50 wt %.

Example 6

A sample of Nylon carpet was heated in a batch oven held at 410° F. with a total residence time of 25 minutes to partially decompose the carpet backing. The oven product was then size reduced using a two-roll mill to liberate the backing residue from the face fiber. Face fiber was separated from the bulk of the backing residue by screening and aspirating. The yield of face fiber was about 52 wt %.

Example 7

Another sample of PET carpet was heated in a batch oven held at 480° F. with a total residence time of 3 minutes to partially decompose the carpet backing. The oven product was then size reduced using a ball mill to liberate the backing residue from the face fiber. Face fiber was separated from the bulk of the backing residue by screening and aspirating. The yield of face fiber was about 58 wt %.

Example 8

Another sample of PET carpet was heated in a batch oven held at 440° F. with a total residence time of 6 minutes to partially decompose the carpet backing. The oven product was then size reduced using a ball mill to liberate the backing residue from the face fiber. Face fiber was separated from the bulk of the backing residue by screening and aspirating. The yield of face fiber was about 64 wt %.

Example 9

PET carpet with jute backing was passed through a convection oven held at 455° F. with a total residence time of 5 minutes to partially decompose the carpet backing. The oven product was then hammer milled to liberate the backing residue from the face fiber. Face fiber was separated from the bulk of the backing residue by screening. The fiber was then further cleaned by carding. The yield of face fiber was about 63 wt %, and the fiber was analyzed at 94% PET. The residual material in the fiber consisted of additional granules of decomposed backing that could have been removed by further carding.

Example 10

Another sample of PET carpet with Shaw "soft back" was passed through a convection oven held at 455° F. with a total residence time of 10 minutes to partially decompose the carpet backing. The oven product was then ball milled to liberate the backing residue from the face fiber. Face fiber was separated from the bulk of the backing residue by screening. The yield of face fiber was about 58 wt %.

Example 11

A sample of Nylon carpet carcass was heated in a batch oven held at 410° F. with a total residence time of 10 minutes to partially decompose the carpet backing. The oven product was then hammer milled to liberate the backing residue from the face fiber. Face fiber was separated from the bulk of the backing residue by screening. The yield of face fiber was about 41 wt %.

We note that the foregoing examples used different types of carpet as feed, and the amount of recoverable fiber will vary from carpet to carpet depending, for example, on the thickness of the pile.

We claim:

1. A process for recovering face fiber material from a carpet that includes a face fiber material and a backing material, the process comprising:
   a) heating the carpet to a temperature lower than the melting point of the face fiber material, but higher than the thermal decomposition temperature of the backing material, for a time and at a temperature sufficient to thermally decompose at least a portion of the backing material, rendering the backing material friable; and
   b) applying mechanical force to the carpet so as to liberate the face fiber material from the friable backing material.

2. The process of claim 1, wherein the carpet is heated in step a) to a temperature from about 175° C. to about 260° C.

3. The process of claim 1, wherein the face fiber material comprises nylon 6, and wherein the carpet is heated in step a) to a temperature from 175° C. to 215° C.

4. The process of claim 1, wherein the face fiber material comprises Nylon 66, and wherein the carpet is heated in step a) to a temperature from 175° C. to 245° C.

5. The process of claim 1, wherein the face fiber material comprises polyethylene terephthalate, and wherein the carpet is heated in step a) to a temperature from 175° C. to 260° C.

6. The process of claim 1, wherein the carpet is heated in step a) for a time from about 0.1 minute to about 120 minutes.

7. The process of claim 1, wherein steps a) and b) are carried out in the same apparatus.

8. The process of claim 1, wherein steps a) and b) are carried out sequentially.

9. The process of claim 1, wherein steps a) and b) are carried out simultaneously.

10. The process of claim 1, wherein steps a) and b) are carried out in a continuous process.

11. The process of claim 1, wherein the carpet is cooled between steps a) and b) causing at least a portion of the backing material to spontaneously fracture.

12. The process of claim, 1 wherein the face fiber material comprises a polyester.

13. The process of claim 1, wherein the face fiber material comprises a polyamide.

14. The process of claim 1, wherein the backing material comprises a polyolefin.

15. The process of claim 1, wherein the backing material comprises a natural fiber.

16. Face fiber material recovered according to the process of claim 1.

17. An extruded article comprising the face fiber material of claim 16.

18. An injection-molded article comprising the face fiber material of claim 16.

19. The process of claim 1, further comprising chemically recycling the face fiber material.

20. The process of claim 1, further comprising separating any inorganic filler from the friable backing material.

21. The inorganic filler separated according to the process of claim 20.

22. A process for recovering face fiber material from a carpet that includes a face fiber material and a backing material of different chemical composition than the face fiber material, the process comprising:
   a) heating the carpet to a temperature lower than the melting point of the face fiber material, but higher than the initial thermal decomposition temperature of the backing material, for a time and at a temperature sufficient to thermally decompose and/or oxidize at least a portion of the backing material, rendering the backing material more friable than the untreated backing;
   b) applying mechanical force to the carpet so as to liberate the face fiber material from the friable backing material; and
   c) removing any contaminants from the face fiber material through one or more mechanical means.

23. The friable backing material recovered according to the process of claim 22.

* * * * *